(12) United States Patent
Wang et al.

(10) Patent No.: US 11,037,346 B1
(45) Date of Patent: Jun. 15, 2021

(54) MULTI-STATION SCANNING GLOBAL POINT CLOUD REGISTRATION METHOD BASED ON GRAPH OPTIMIZATION

(71) Applicant: NANJING UNIVERSITY OF AERONAUTICS AND ASTRONAUTICS, Jiangsu (CN)

(72) Inventors: Jun Wang, Jiangsu (CN); Yan Wang, Jiangsu (CN); Yuanpeng Liu, Jiangsu (CN); Qian Xie, Jiangsu (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 17/026,260

(22) Filed: Sep. 20, 2020

(30) Foreign Application Priority Data

Apr. 29, 2020 (CN) .............................. 202010355390

(51) Int. Cl.
*G06T 11/20* (2006.01)
*G06T 7/70* (2017.01)

(52) U.S. Cl.
CPC .............. *G06T 11/206* (2013.01); *G06T 7/70* (2017.01); *G06T 2207/10028* (2013.01); *G06T 2210/12* (2013.01)

(58) Field of Classification Search
None
See application file for complete search history.

(56) References Cited

U.S. PATENT DOCUMENTS

| 2018/0158235 A1* | 6/2018 | Wu ......................... G06T 19/20 |
| 2018/0232954 A1* | 8/2018 | Frank ...................... G06T 19/00 |
| 2018/0276885 A1* | 9/2018 | Singh ...................... G06T 17/20 |
| 2020/0096328 A1* | 3/2020 | Raab ........................ G01S 5/16 |

FOREIGN PATENT DOCUMENTS

| CN | 103307999 B | 1/2016 |
| CN | 105931234 A | 9/2016 |
| CN | 109377521 A | 2/2019 |
| CN | 110579771 A | 12/2019 |

\* cited by examiner

*Primary Examiner* — Jeffrey J Chow

(57) ABSTRACT

Disclosed a multi-station scanning global point cloud registration method based on graph optimization, including acquiring multi-station original three-dimensional point cloud data; based on initial registration of targets, completing initial registration of point cloud data at adjacent stations by virtue of the target at each angle of view; calculating a point cloud overlap area at adjacent angles of view, and calculating areas of overlap regions of adjacent point cloud by a gridded sampling method; constructing a fine registration graph structure, and constructing a fine registration graph by taking point cloud data of each station as a node of the graph and taking an overlap area of the point cloud data of adjacent stations as a side of adjacent nodes of the graph structure; and based on loop closure fine registration based on graph optimization, gradually completing point cloud fine registration of the whole aircraft according to a specific closure sequence.

15 Claims, 3 Drawing Sheets

MULTI-STATION SCANNING GLOBAL POINT CLOUD REGISTRATION METHOD BASED ON GRAPH OPTIMIZATION

CROSS-REFERENCE TO RELATED APPLICATIONS

This application claims the benefit of priority from Chinese Patent Application No. 202010355390.X, filed on Apr. 29, 2020. The content of the aforementioned applications, including any intervening amendments thereto, is incorporated herein by reference in its entirety.

TECHNICAL FIELD

The present invention belongs to the technical field of target detection, relates to an aircraft point cloud registration method and particularly relates to a multi-station scanning global point cloud registration method based on graph optimization.

BACKGROUND OF THE PRESENT INVENTION

In the field of aircraft manufacturing, high-precision manufacturing requirements for the whole aircraft are continuously improved. Meanwhile, accurate detection of the aircraft becomes more and more important. Over a long period in the past, a three-coordinate measurement method has been widely applied in precision manufacturing because of its high precision. However, for large-size products such as aircrafts, overall measurement of the aircraft is difficult to be completed by a three-coordinate measuring machine. Under such a background, a three-dimensional laser scanning technique emerges at the right moment, is widely applied to acquiring object surface data, and can acquire point cloud data in a surrounding scene in a short time, thereby greatly increasing the detection efficiency of a large-size object.

For the overall measurement of the aircraft, local point cloud data of the aircraft may be acquired from different angles of view by virtue of three-dimensional laser scanning, and the local point cloud data of the aircraft is registered. In the prior art, for multi-view-of-angle point cloud registration, a method for repeatedly executing registration in pairs is mostly adopted; data computation is large; and efficiency is low. Meanwhile, each pair of point cloud registration errors is easy to be accumulated into an overall error, so that the registration error is large.

SUMMARY OF THE PRESENT INVENTION

The present invention proposes a multi-station scanning global point cloud registration method based on graph optimization with higher efficiency and accuracy.

Technical solutions adopted in the present invention are as follows: The multi-station scanning global point cloud registration method based on graph optimization includes the following steps:

step 1: acquiring three-dimensional point cloud data of a multi-view original aircraft with targets;

acquiring local point cloud data of the aircraft at multiple stations by utilizing a three-dimensional laser scanner, and placing more than 4 cross targets between the aircraft and the three-dimensional laser scanner at each station to serve as an initial registration basis;

step 2: performing initial registration;

performing target pairing according to a position relation of targets at adjacent stations, and completing initial registration;

step 3: calculating overlap areas of adjacent point cloud;

calculating point cloud areas of point cloud data overlap regions at adjacent stations by a grid downsampling method;

step 4: constructing a graph structure;

constructing a fine registration graph by taking point cloud data of each station as a node of the graph structure and taking the point cloud area of the overlap region of the point cloud data at adjacent stations as a weight of sides of adjacent nodes of the graph structure; and step 5: performing loop closure-based hierarchical registration;

on the basis of the fine registration graph, obtaining a maximum spanning tree and obtaining a loop-free tree structure; successively adding edges to the maximum spanning tree to form loops; and closing the formed loops in sequence, thereby realizing fine registration of multi-view point cloud of the aircraft.

Further, in the step 1, the cross targets are turnable circular quartering black and white markers; centers of the cross targets have invariable positions during turning; and in the more than 4 cross targets placed between the aircraft and the three-dimensional laser scanner at each station, optional 3 cross targets are non-collinear.

Further, in the step 1, the model of the three-dimensional laser scanner is Leica ScanStation P20.

Further, in the step 2, initial registration is initial registration of corresponding points based on target topology, and is specifically as follows:

$Q=\{q_1, q_2, \ldots q_n\}$ represents a group of targets under one angle of view; $P=\{p_1, p_2, \ldots p_n\}$ represents the same group of targets under an adjacent angle of view; the target of the adjacent angle of view corresponding to any one target $q_i$ is $p_i$; and $i=1, 2, 3, \ldots, n$.

A transformation matrix of point cloud in which the two groups of targets are located is determined by a formula (1):

$$(R, t) = \mathrm{argmin} \sum_{i=1}^{n} \|(Rp_i + t) - q_i\|^2 \qquad (1)$$

In the formula (1), R is a rotation matrix of the point cloud in which the two groups of targets are located; t is a translation matrix of the point cloud in which the two groups of targets are located; the rotation matrix and the translation matrix are collectively called the transformation matrixes; argmin represents a solved minimum value of the expression $$\sum_{i=1}^{n} \|(Rp_i + t) - q_i\|^2; \|\ \|^2$$

represents the Euclidean distance; $p_i$ and $q_i$ respectively represent target coordinates under corresponding angles of view; and n represents the number of targets under the same angle of view.

Assuming $$F(t) = \mathrm{argmin} \sum_{i=1}^{n} \|(Rp_i + t) - q_i\|^2,$$

a partial derivative of the F(t) is solved so as to obtain a rotation matrix:

$$\frac{\partial F}{\partial t} = \operatorname{argmin} \sum_{i=1}^{n} \|(Rp_i + t) - q_i\|^2 = 0 \quad (2)$$

In the formula (2), assuming $t=\bar{q}-R\bar{t}$, $\bar{p}$ and $\bar{q}$ are respectively barycentric coordinates of sets P and Q of the two groups of targets;

$$\bar{p} = \frac{\sum_{1}^{n} p_i}{n}, \bar{q} = \frac{\sum_{1}^{n} q_i}{n},$$

and a barycenter translation quantity of the data P and Q of the two groups of targets is the solved translation quantity of the two pieces of point cloud.

After translation, new coordinates $x_i$ of the targets P and new coordinates $y_i$ of the targets Q are respectively represented as follows:

$$x_i = p_i - \bar{p}, \ y_i = q_i - \bar{q} \quad (3)$$

The formula (3) is substituted into the formula (1) so as to obtain a formula as follows:

$$\operatorname{argmin} \sum_{i=1}^{n} \|Rx_i - y_i\|^2 = \operatorname{argmin} \sum_{i=1}^{n} (x_i^T x_i - 2y_i^T R x_i + y_i^T y_i) \quad (4)$$

To solve the formula (4), $$\operatorname{argmin} \sum_{i=1}^{n} y_i^T R x_i = \operatorname{trace}\left(R \sum_{i=1}^{n} y_i^T x_i\right) = \operatorname{trace}(RH)$$

is calculated first, wherein trace( ) represents tracing of the matrix;

$$H = \sum_{i=1}^{n} y_i^T x_i$$

is subjected to SVD decomposition so as to obtain $H=U\Lambda V^T$, wherein U, $\Lambda$ and V are items obtained after SVD decomposition; during $R=V\Lambda^T$, a minimum value is obtained from the equation (4), thereby obtaining a rotation parameter $R=V\Lambda^T$. Thus, the target-based initial registration is completed.

Further, the step 3 specifically includes:

step 3-1: acquiring a bounding box of point cloud in an overlap region, wherein directions on three sides of the bounding box are three principal component directions of the point cloud in the overlap region;

step 3-2: discretizing the bounding box into grid cubes; traversing points in each grid cube; calculating a distance from each point to the center of a corresponding grid cube; taking a point closest to the center of each grid cube in the grid cubes as a sampling point; and completing point cloud downsampling, thereby realizing uniform point cloud density; and step 3-3: taking a number of points after downsampling in the overlap region as an expression of areas.

Further, in the step 3-2, a size of each grid cube is 10 mm*10 mm*10 mm.

Further, the step 5 specifically includes:

step 5-1: calculating a maximum spanning tree of the fine registration graph by a Kruskal algorithm;

step 5-2: calculating the sum of weights of adjacent edges in the obtained maximum spanning tree; adding an edge onto the edge having the maximum sum of weights to form a loop; and closing the loop, wherein the loop closure process is realized by an ICP method; and step 5-3: repeating the step 5-2 until no new loop may be generated; and completing fine registration based on graph optimization so as to obtain complete point cloud data of the entire aircraft.

Compared with the prior art, the present invention has beneficial effects as follows:

After the multi-view point cloud data is acquired by multi-station scanning, the initial registration is performed by utilizing the target, coarse registration of the large-scale point cloud data can be efficiently completed, direct operation of huge amounts of data is avoided, and the overall registration efficiency is increased. The point cloud fine registration of the aircraft is realized by the improved calculation method of the point cloud overlap area, and the influence that the aircraft point cloud data density is non-uniform is overcome. In addition, the method in the present invention is difficult to be affected by the external environment or limited by the object size during operation, the overall data of the surface of the aircraft may be acquired in a short time, and data processing accuracy is ensured.

The method in the present invention is economic, practical and high in detection accuracy and efficiency, and can be popularized in detection of other large-scale products.

DETAILED DESCRIPTION OF THE PRESENT INVENTION

A multi-station scanning global point cloud registration method based on graph optimization in the present invention is further described in detail below in combination with drawings and specific embodiments.

Figure 1:
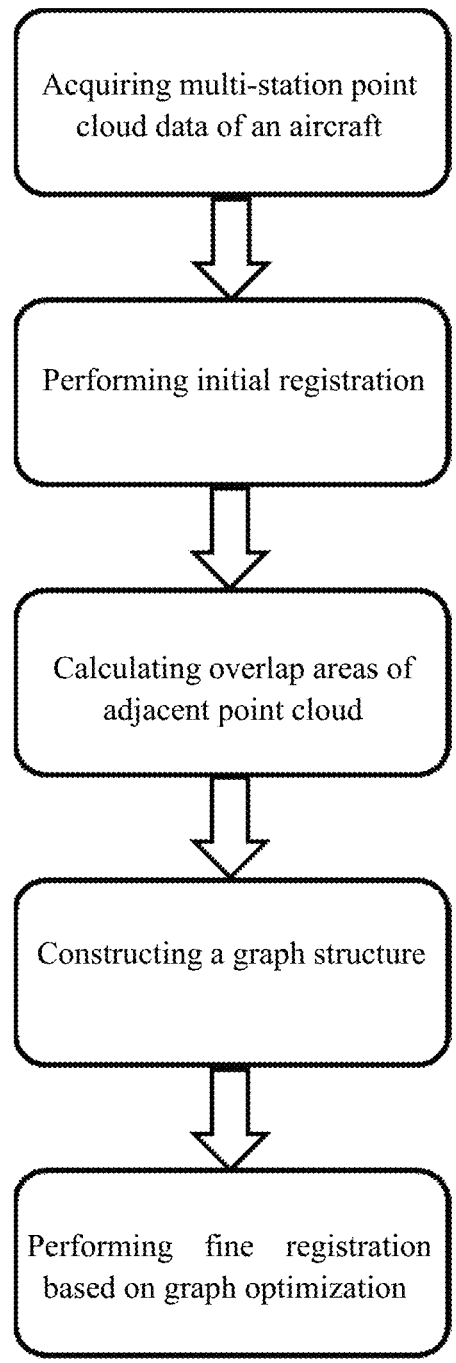
FIG. 1 is a flow block diagram of a multi-station scanning global point cloud registration method based on graph optimization in the present invention.

As shown in FIG. 1, the multi-station scanning global point cloud registration method based on graph optimization includes the following steps:

Step 1: acquiring three-dimensional point cloud data of a multi-view original aircraft with targets.

Local point cloud data of the aircraft is acquired at multiple stations by utilizing a three-dimensional laser scanner (such as a model of ScanStationP20) and saved. More than 4 cross targets are placed between the aircraft and the three-dimensional laser scanner at each station so as to serve as an initial registration basis. A placement manner of the targets is as follows: the cross targets are dispersed and arranged between the three-dimensional laser scanner and the aircraft; each of the cross targets faces the three-dimensional laser scanner; and a condition that more than 3 cross targets are collinear is avoided. It should be noted that the base position of each target should be kept fixed; and the cross targets on the target bases may freely turn, to ensure that centers of the cross targets have invariable positions during turning, so as to provide relative positions during scanning at different angles of view. For scanners at adjacent stations, at least 4 identical cross targets should be acquired for initial registration. In the present embodiment, the cross targets are turnable circular quartering black and white markers, and the markers are the existing markers.

Step 2: performing initial registration.

Specifically, the step of performing target pairing according to a position relation of targets at adjacent stations and performing initial registration on corresponding points based on the target topology includes:

$Q=\{q_1, q_2, \ldots q_n\}$ represents a group of targets under one angle of view; $P=\{p_1, p_2, \ldots p_n\}$ represents the same group of targets under an adjacent angle of view; the target of the adjacent angle of view corresponding to any one target is $p_i$; and i=1, 2, 3, ..., n.

A transformation matrix of point cloud in which the two groups of targets are located is determined by a formula (1):

$$(R, t) = \operatorname{argmin} \sum_{i=1}^{n} \|(Rp_i + t) - q_i\|^2 \qquad (1)$$

In the formula (1), R is a rotation matrix of the point cloud in which the two groups of targets are located; t is a translation matrix of the point cloud in which the two groups of targets are located; the rotation matrix and the translation matrix are collectively called the transformation matrixes; argmin represents a solved minimum value of the expression $$\sum_{i=1}^{n} \|(Rp_i + t) - q_i\|^2; \|\ \|^2$$

represents the Euclidean distance; $p_i$ and $q_i$ respectively represent target coordinates under corresponding angles of view; and n represents the number of targets under the same angle of view. The formula (1) represents values of the R and t when the expression on the right of the equal sign obtains the minimum value.

In order to conveniently express the solved partial derivative, assuming F(t) is equal to the formula (t), that is, $$F(t) = \operatorname{argmin} \sum_{i=1}^{n} \|(Rp_i + t) - q_i\|^2,$$

a partial derivative of the F(t) is solved so as to obtain a rotation matrix:

$$\frac{\partial F}{\partial t} = \operatorname{argmin} \sum_{i=1}^{n} \|(Rp_i + t) - q_i\|^2 = 0 \qquad (2)$$

In the formula (2), by adopting a method for performing translation and rotation in sequence, the data of the two groups of targets are overlapped.

Assuming $t = \bar{q} - R\bar{t}$, $\bar{p}$ and $\bar{q}$ are respectively barycentric coordinates of sets P and Q of the two groups of targets;

$$\bar{p} = \frac{\sum_{1}^{n} p_i}{n}, \bar{q} = \frac{\sum_{1}^{n} q_i}{n},$$

and a barycenter translation quantity of the data P and Q of the two groups of targets is the solved translation quantity of the two pieces of point cloud.

After translation, new coordinates $x_i$ of the targets P and new coordinates $y_i$ of the targets Q are respectively represented:

$$x_i = p_i - \bar{p}, y_i = q_i - \bar{q} \qquad (3)$$

The formula (3) is substituted into the formula (1) so as to obtain a formula:

$$\operatorname{argmin} \sum_{i=1}^{n} \|Rx_i - y_i\|^2 = \operatorname{argmin} \sum_{i=1}^{n} (x_i^T x_i - 2 y_i^T R x_i + y_i^T y_i) \qquad (4)$$

To solve the formula (4), $$\operatorname{argmin} \sum_{i=1}^{n} y_i^T R x_i = \operatorname{trace}\left(R \sum_{i=1}^{n} y_i^T x_i\right) = \operatorname{trace}(RH)$$

is calculated first, wherein trace( ) represents tracing of the matrix;

$$H = \sum_{i=1}^{n} y_i^T x_i$$

is subjected to SVD decomposition (a formula of performing decomposition on the matrix, that is, a universal method) so as to obtain $H = U\Lambda V^T$, wherein U, $\Lambda$ and V are items obtained after SVD decomposition; when $R = V\Lambda^T$, a minimum value is obtained from the equation (4), thereby obtaining a rotation parameter $R = V\Lambda^T$. Thus, the target-based initial registration is completed.

Step 3: calculating overlap areas of adjacent point cloud.

For the point cloud that has completed initial registration, the overlap region of adjacent point cloud can be obtained. To realize fine registration, the overlap area of the adjacent point cloud is calculated at first. Since most of the aircraft surfaces are free-form surfaces, direct calculation efficiency of the area is lower. Therefore, the overlap area is expressed by the quantity of points in the overlap region.

Figure 2:
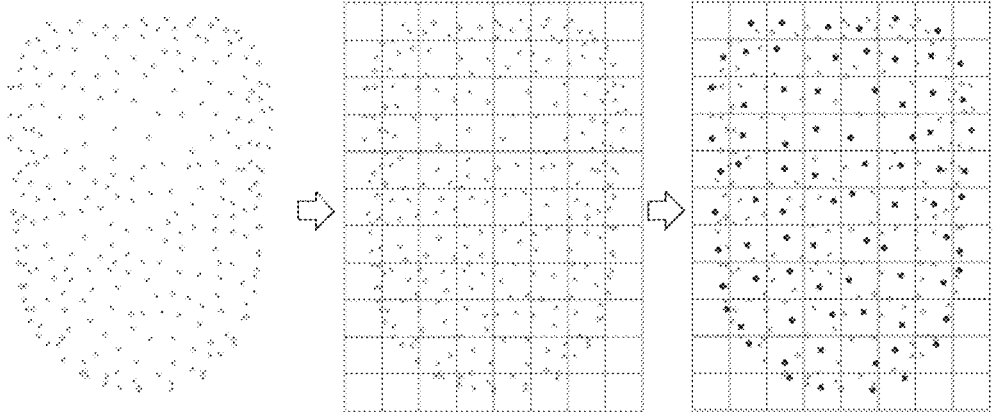
FIG. 2 is a schematic diagram of a gridded uniform downsampling process in the present invention.

Since the large-area region is scanned by the laser scanner, the point cloud density cannot be kept consistent. Thus, the quantity of the points in the overlap region cannot be directly used as the area expression. Therefore, the point cloud is downsampled by adopting a gridded sampling method, so that the point cloud in all overlap regions has the same density. The areas of the overlap regions are characterized by the quantity of the points on this basis, as show in FIG. 2. The step 3 specifically includes:

Step 3-1: obtaining an overlap region of two pieces of point cloud after data registration of the two pieces of point cloud; and acquiring a bounding box of the point cloud in the overlap region at first, wherein directions on three sides of the bounding box are three principal component directions of the point cloud in the region obtained by a PCA algorithm (the PCA algorithm is a universal algorithm, and the 3 principal component directions of the point cloud can be obtained).

Step 3-2: discretizing the bounding box into grid cubes; traversing points in each grid cube; calculating a distance from each point to the center of a corresponding grid cube; taking a point closest to the center of each grid cube in the grid cubes as a sampling point; and completing point cloud downsampling, thereby realizing uniform point cloud density. In the present embodiment, a size of each grid cube is 10 mm*10 mm*10 mm.

Step 3-3: taking a number of points after downsampling in the overlap region as an expression of areas.

Step 4: constructing a graph structure.

A fine registration graph is constructed by taking point cloud data of each station as a node of the graph structure and taking the overlap area of the point cloud data at adjacent stations as a weight of sides of adjacent nodes of the graph structure.

Step 5: performing loop closure-based hierarchical registration.

Figure 3:
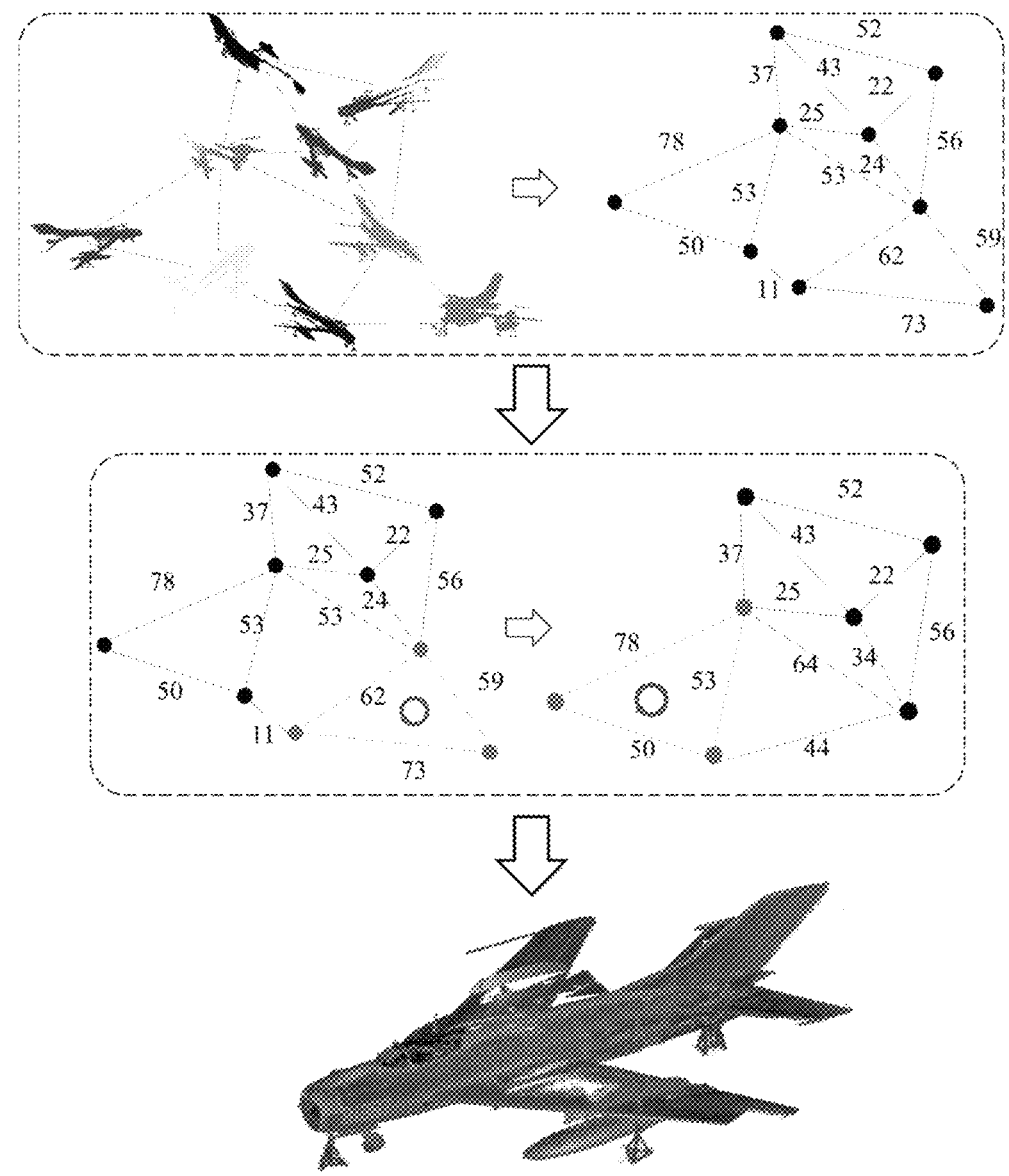
FIG. 3 is a schematic diagram of a fine registration process based on graph optimization in the present invention.

On the basis of the fine registration graph, a maximum spanning tree is obtained, and a loop-free tree structure is obtained. Edges are successively added to the maximum spanning tree to form loops; and the formed loops are closed in sequence, thereby realizing fine registration of multi-view point cloud of the aircraft, as shown in FIG. 3. The step 5 specifically includes:

Step 5-1: calculating a maximum spanning tree of the fine registration graph by a Kruskal algorithm (the Kruskal algorithm is a universal algorithm).

Step 5-2: calculating the sum of weights of adjacent edges in the obtained maximum spanning tree; adding an edge onto the edge having the maximum sum of weights to form a loop; and closing the loop, wherein the loop closure process is realized by an ICP registration method (the point cloud registration method is an existing basic algorithm).

Step 5-3: repeating the step 5-2 in the newly generated tree structure until no new loop may be generated; and completing fine registration based on graph optimization so as to obtain complete point cloud data of the entire aircraft.

The above only describes specific embodiments of the present invention, but the protection scope of the present invention is not limited thereto. Replacement or transformation methods that may be easily thought by those skilled in the art in the scope of technical methods disclosed in the present invention shall be included in the protection scope of the present invention.

What is claimed is:

1. A multi-station scanning global point cloud registration method based on graph optimization, comprising the following steps:
step 1: acquiring three-dimensional point cloud data of a multi-view original aircraft with targets;
acquiring local point cloud data of the aircraft at multiple stations by utilizing a three-dimensional laser scanner, and placing more than 4 cross targets between the aircraft and the three-dimensional laser scanner at each station to serve as an initial registration basis;
step 2: performing initial registration;
performing target pairing according to a position relation of targets at adjacent stations, and completing initial registration;
step 3: calculating overlap areas of adjacent point cloud;
calculating point cloud areas of point cloud data overlap regions at adjacent stations by a grid downsampling method;
step 4: constructing a graph structure;
constructing a fine registration graph by taking point cloud data of each station as a node of the graph structure and taking the point cloud area of the overlap region of the point cloud data at adjacent stations as a weight of edges of adjacent nodes of the graph structure; and
step 5: performing loop closure-based hierarchical registration;
on the basis of the fine registration graph, obtaining a maximum spanning tree and obtaining a loop-free tree structure; successively adding edges to the maximum spanning tree to form loops; and closing the formed loops in sequence, thereby realizing fine registration of multi-view point cloud of the aircraft.

2. The multi-station scanning global point cloud registration method based on graph optimization according to claim 1, wherein in the step 1, the cross targets are turnable circular quartering black and white markers; centers of the cross targets have invariable positions during turning; and in the more than 4 cross targets placed between the aircraft and the three-dimensional laser scanner at each station, optional 3 cross targets are non-collinear.

3. The multi-station scanning global point cloud registration method based on graph optimization according to claim 1, wherein in the step 1, the model of the three-dimensional laser scanner is ScanStation P20.

4. The multi-station scanning global point cloud registration method based on graph optimization according to claim 1, wherein in the step 2, initial registration is initial registration of corresponding points based on target topology, and is specifically as follows:

$Q=\{q_1, q_2, \ldots, q_n\}$ represents a group of targets under one angle of view; $P=\{p_1, p_2, \ldots, p_n\}$ represents the same group of targets under an adjacent angle of view; the target of the adjacent angle of view corresponding to any one target $q_i$ is $p_i$; and $i=1, 2, 3, \ldots, n$;

a transformation matrix of point cloud in which the two groups of targets are located is determined by a formula (1):

$$(R, t) = \operatorname{argmin} \sum_{i=1}^{n} \|(Rp_i + t) - q_i\|^2 \qquad (1)$$

in the formula (1), R is a rotation matrix of the point cloud in which the two groups of targets are located; t is a translation matrix of the point cloud in which the two groups of targets are located; the rotation matrix and the translation matrix are collectively called the transformation matrixes; argmin represents a solved minimum value of the expression $$\sum_{i=1}^{n} \|(Rp_i + t) - q_i\|^2; \|\,\|^2$$

represents the Euclidean distance; $p_i$ and $q_i$ respectively represent target coordinates under corresponding angles of view; and n represents the number of targets under the same angle of view;

assuming $$F(t) = \text{argmin} \sum_{i=1}^{n} \|(Rp_i + t) - q_i\|^2, \qquad (5)$$

a partial derivative of the F(t) is solved so as to obtain a rotation matrix:

$$\frac{\partial F}{\partial t} = \text{argmin} \sum_{i=1}^{n} \|(Rp_i + t) - q_i\|^2 = 0 \qquad (2)$$

in the formula (2), assuming $t=\bar{q}-R\bar{t}$, $\bar{p}$ and $\bar{q}$ are respectively barycentric coordinates of sets P and Q of the two groups of targets;

$$\bar{p} = \frac{\sum_{1}^{n} p_i}{n}, \bar{q} = \frac{\sum_{1}^{n} q_i}{n},$$

and a barycenter translation quantity of the data P and Q of the two groups of targets is the solved translation quantity of the two pieces of point cloud;

after translation, new coordinates $x_i$ of the targets P and new coordinates $y_i$ of the targets Q are respectively represented as follows:

$$x_i = p_i - \bar{p}, \, y_i = q_i - \bar{q} \qquad (3)$$

the formula (3) is substituted into the formula (1) so as to obtain a formula as follows:

$$\text{argmin} \sum_{i=1}^{n} \|Rx_i - y_i\|^2 = \text{argmin} \sum_{i=1}^{n} (x_i^T x_i - 2 y_i^T R x_i + y_i^T y_i) \qquad (4)$$

to solve the formula (4), $$\text{argmin} \sum_{i=1}^{n} y_i^T R x_i = \text{trace}\left(R \sum_{i=1}^{n} y_i^T x_i\right) = \text{trace}(RH)$$

is calculated first, wherein trace( ) represents tracing of the matrix;

$$H = \sum_{i=1}^{n} y_i^T x_i$$

is subjected to SVD decomposition so as to obtain $H=U\Lambda V^T$, wherein U, $\Lambda$ and V are items obtained after SVD decomposition; during $R=V\Lambda^T$; a minimum value is obtained from the equation (4), thereby obtaining a rotation parameter $R=V\Lambda T$; and thus, the target-based initial registration is completed.

5. The multi-station scanning global point cloud registration method based on graph optimization according to claim 4, wherein the step 3 specifically comprises:
step 3-1: acquiring a bounding box of point cloud in an overlap region, wherein directions on three sides of the bounding box are three principal component directions of the point cloud in the overlap region;
step 3-2: discretizing the bounding box into grid cubes; traversing points in each grid cube; calculating a distance from each point to the center of a corresponding grid cube; taking a point closest to the center of each grid cube in the grid cubes as a sampling point; and completing point cloud downsampling, thereby realizing uniform point cloud density; and
step 3-3: taking a number of points after downsampling in the overlap region as an expression of areas.

6. The multi-station scanning global point cloud registration method based on graph optimization according to claim 5, wherein in the step 3-2, a size of each grid cube is 10 mm*10 mm*10 mm.

7. The multi-station scanning global point cloud registration method based on graph optimization according to claim 5, wherein the step 5 specifically comprises:
step 5-1: calculating a maximum spanning tree of the fine registration graph by a Kruskal algorithm;
step 5-2: calculating the sum of weights of adjacent edges in the obtained maximum spanning tree; adding an edge onto the edge having the maximum sum of weights to form a loop; and closing the loop, wherein the loop closure process is realized by an ICP method; and
step 5-3: repeating the step 5-2 until no new loop may be generated; and completing fine registration based on graph optimization so as to obtain complete point cloud data of the entire aircraft.

8. The multi-station scanning global point cloud registration method based on graph optimization according to claim 2, wherein in the step 2, initial registration is initial registration of corresponding points based on target topology, and is specifically as follows:
$Q=\{q_1, q_2, \ldots q_n\}$ represents a group of targets under one angle of view; $P=\{p_1, p_2, \ldots, p_n\}$ represents the same group of targets under an adjacent angle of view; the target of the adjacent angle of view corresponding to any one target $q_i$ is $p_i$; and $i=1, 2, 3, \ldots, n$;
a transformation matrix of point cloud in which the two groups of targets are located is determined by a formula (1):

$$(R, t) = \text{argmin} \sum_{i=1}^{n} \|(Rp_i + t) - q_i\|^2 \qquad (1)$$

in the formula (1), R is a rotation matrix of the point cloud in which the two groups of targets are located; t is a translation matrix of the point cloud in which the two groups of targets are located; the rotation matrix and the translation matrix are collectively called the transformation matrixes; argmin represents a solved minimum value of the expression $$\sum_{i=1}^{n} \|(Rp_i + t) - q_i\|^2; \|\,\|^2$$

represents the Euclidean distance; $p_i$ and $q_i$ respectively represent target coordinates under corresponding angles of view; and n represents the number of targets under the same angle of view;

assuming $$F(t) = \operatorname{argmin} \sum_{i=1}^{n} \|(Rp_i + t) - q_i\|^2,$$

a partial derivative of the F(t) is solved so as to obtain a rotation matrix:

$$\frac{\partial F}{\partial t} = \operatorname{argmin} \sum_{i=1}^{n} \|(Rp_i + t) - q_i\|^2 = 0 \qquad (2)$$

in the formula (2), assuming $t=\bar{q}-R\bar{t}$, $\bar{p}$ and $\bar{q}$ are respectively barycentric coordinates of sets P and Q of the two groups of targets;

$$\bar{p} = \frac{\sum_{1}^{n} p_i}{n}, \bar{q} = \frac{\sum_{1}^{n} q_i}{n},$$

and a barycenter translation quantity of the data P and Q of the two groups of targets is the solved translation quantity of the two pieces of point cloud;

after translation, new coordinates $x_i$ of the targets P and new coordinates $y_i$ of the targets Q are respectively represented as follows:

$$x_i = p_i - \bar{p}, \ y_i = q_i - \bar{q} \qquad (3)$$

the formula (3) is substituted into the formula (1) so as to obtain a formula as follows:

$$\operatorname{argmin} \sum_{i=1}^{n} \|Rx_i - y_i\|^2 = \operatorname{argmin} \sum_{i=1}^{n} (x_i^T x_i - 2 y_i^T R x_i + y_i^T y_i) \qquad (4)$$

to solve the formula (4), $$\operatorname{argmin} \sum_{i=1}^{n} y_i^T R x_i = \operatorname{trace}\left(R \sum_{i=1}^{n} y_i^T x_i\right) = \operatorname{trace}(RH)$$

is calculated first, wherein trace( ) represents tracing of the matrix;

$$H = \sum_{i=1}^{n} y_i^T x_i$$

is subjected to SVD decomposition so as to obtain $H=U\Lambda V^T$, wherein U, $\Lambda$ and V are items obtained after SVD decomposition; during $R=V\Lambda^T$; a minimum value is obtained from the equation (4), thereby obtaining a rotation parameter $R=V\Lambda^T$; and thus, the target-based initial registration is completed.

9. The multi-station scanning global point cloud registration method based on graph optimization according to claim 8, wherein the step 3 specifically comprises:

step 3-1: acquiring a bounding box of point cloud in an overlap region, wherein directions on three sides of the bounding box are three principal component directions of the point cloud in the overlap region;

step 3-2: discretizing the bounding box into grid cubes; traversing points in each grid cube; calculating a distance from each point to the center of a corresponding grid cube; taking a point closest to the center of each grid cube in the grid cubes as a sampling point; and completing point cloud downsampling, thereby realizing uniform point cloud density; and step 3-3: taking a number of points after downsampling in the overlap region as an expression of areas.

10. The multi-station scanning global point cloud registration method based on graph optimization according to claim 9, wherein in the step 3-2, a size of each grid cube is 10 mm*10 mm*10 mm.

11. The multi-station scanning global point cloud registration method based on graph optimization according to claim 9, wherein the step 5 specifically comprises:

step 5-1: calculating a maximum spanning tree of the fine registration graph by a Kruskal algorithm;

step 5-2: calculating the sum of weights of adjacent edges in the obtained maximum spanning tree; adding an edge onto the edge having the maximum sum of weights to form a loop; and closing the loop, wherein the loop closure process is realized by an ICP method; and step 5-3: repeating the step 5-2 until no new loop may be generated; and completing fine registration based on graph optimization so as to obtain complete point cloud data of the entire aircraft.

12. The multi-station scanning global point cloud registration method based on graph optimization according to claim 3, wherein in the step 2, initial registration is initial registration of corresponding points based on target topology, and is specifically as follows:

$Q=\{q_1, q_2, \ldots q_n\}$ represents a group of targets under one angle of view; $P=\{p_1, p_2, \ldots p_n\}$ represents the same group of targets under an adjacent angle of view; the target of the adjacent angle of view corresponding to any one target $q_i$ is $p_i$; and i=1, 2, 3, . . . , n;

a transformation matrix of point cloud in which the two groups of targets are located is determined by a formula (1):

$$(R, t) = \operatorname{argmin} \sum_{i=1}^{n} \|(Rp_i + t) - q_i\|^2 \qquad (1)$$

in the formula (1), R is a rotation matrix of the point cloud in which the two groups of targets are located; t is a translation matrix of the point cloud in which the two groups of targets are located; the rotation matrix and the translation matrix are collectively called the transformation matrixes; argmin represents a solved minimum value of the expression $$\sum_{i=1}^{n} \|(Rp_i + t) - q_i\|^2; \|\ \|^2$$

represents the Euclidean distance; $p_i$ and $q_i$ respectively represent target coordinates under corresponding angles of view; and n represents the number of targets under the same angle of view;

assuming $$F(t) = \operatorname{argmin} \sum_{i=1}^{n} \|(Rp_i + t) - q_i\|^2,$$

a partial derivative of the F(t) is solved so as to obtain a rotation matrix:

$$\frac{\partial F}{\partial t} = \operatorname{argmin} \sum_{i=1}^{n} \|(Rp_i + t) - q_i\|^2 = 0 \quad (2)$$

in the formula (2), assuming $t = \bar{q} - R\bar{t}$, $\bar{p}$ and $\bar{q}$ are respectively barycentric coordinates of sets P and Q of the two groups of targets;

$$\bar{p} = \frac{\sum_{1}^{n} p_i}{n}, \bar{q} = \frac{\sum_{1}^{n} q_i}{n},$$

and a barycenter translation quantity of the data P and Q of the two groups of targets is the solved translation quantity of the two pieces of point cloud;

after translation, new coordinates $x_i$ of the targets P and new coordinates $y_i$ of the targets Q are respectively represented as follows:

$$x_i = p_i - \bar{p}, \; y_i = q_i - \bar{q} \quad (3)$$

the formula (3) is substituted into the formula (1) so as to obtain a formula as follows:

$$\operatorname{argmin} \sum_{i=1}^{n} \|Rx_i - y_i\|^2 = \operatorname{argmin} \sum_{i=1}^{n} (x_i^T x_i - 2 y_i^T R x_i + y_i^T y_i) \quad (4)$$

to solve the formula (4), $$\operatorname{argmin} \sum_{i=1}^{n} y_i^T R x_i = \operatorname{trace}\left(R \sum_{i=1}^{n} y_i^T x_i\right) = \operatorname{trace}(RH)$$

is calculated first, wherein trace( ) represents tracing of the matrix;

$$H = \sum_{i=1}^{n} y_i^T x_i$$

is subjected to SVD decomposition so as to obtain $H = U\Lambda V^T$, wherein U, $\Lambda$ and V are items obtained after SVD decomposition; during $R = V\Lambda^T$, a minimum value is obtained from the equation (4), thereby obtaining a rotation parameter $R = V\Lambda^T$; and thus, the target-based initial registration is completed.

13. The multi-station scanning global point cloud registration method based on graph optimization according to claim 12, wherein the step 3 specifically comprises:
   step 3-1: acquiring a bounding box of point cloud in an overlap region, wherein directions on three sides of the bounding box are three principal component directions of the point cloud in the overlap region;
   step 3-2: discretizing the bounding box into grid cubes; traversing points in each grid cube; calculating a distance from each point to the center of a corresponding grid cube; taking a point closest to the center of each grid cube in the grid cubes as a sampling point; and completing point cloud downsampling, thereby realizing uniform point cloud density; and
   step 3-3: taking a number of points after downsampling in the overlap region as an expression of areas.

14. The multi-station scanning global point cloud registration method based on graph optimization according to claim 13, wherein in the step 3-2, a size of each grid cube is 10 mm*10 mm*10 mm.

15. The multi-station scanning global point cloud registration method based on graph optimization according to claim 13, wherein the step 5 specifically comprises:
   step 5-1: calculating a maximum spanning tree of the fine registration graph by a Kruskal algorithm;
   step 5-2: calculating the sum of weights of adjacent edges in the obtained maximum spanning tree; adding an edge onto the edge having the maximum sum of weights to form a loop; and closing the loop, wherein the loop closure process is realized by an ICP method; and
   step 5-3: repeating the step 5-2 until no new loop may be generated; and completing fine registration based on graph optimization so as to obtain complete point cloud data of the entire aircraft.

* * * * *